United States Patent
Lymer et al.

(10) Patent No.: US 9,111,292 B2
(45) Date of Patent: Aug. 18, 2015

(54) DYNAMIC MESSAGING IN A PERSONAL DATA PROTECTION SUITE

(71) Applicants: Brent Lymer, Las Vegas, NV (US); Pankaj Srivastava, Santa Clara, CA (US); Juan Gamez, Foster City, CA (US)

(72) Inventors: Brent Lymer, Las Vegas, NV (US); Pankaj Srivastava, Santa Clara, CA (US); Juan Gamez, Foster City, CA (US)

(73) Assignee: White Sky, Inc., Mountain View, CA (US)

( * ) Notice: Subject to any disclaimer, the term of this patent is extended or adjusted under 35 U.S.C. 154(b) by 319 days.

(21) Appl. No.: 13/650,133

(22) Filed: Oct. 12, 2012

(65) Prior Publication Data
US 2014/0109205 A1    Apr. 17, 2014

(51) Int. Cl.
| G06F 7/04 | (2006.01) |
| H04L 29/06 | (2006.01) |
| H04L 9/32 | (2006.01) |
| G06Q 30/02 | (2012.01) |
| G06F 21/31 | (2013.01) |
| G06F 21/62 | (2013.01) |
| G06F 21/10 | (2013.01) |

(52) U.S. Cl.
CPC .............. *G06Q 30/02* (2013.01); *G06F 21/10* (2013.01); *G06F 21/31* (2013.01); *G06F 21/6218* (2013.01); *H04L 63/0428* (2013.01); *H04L 63/08* (2013.01); *H04L 63/083* (2013.01)

(58) Field of Classification Search
CPC ..... G06F 21/31; G06F 21/6218; G06F 21/10; H04L 63/083; H04L 63/08; H04L 63/0428
USPC .............................. 726/6, 4, 26; 713/165, 168
See application file for complete search history.

(56) References Cited

U.S. PATENT DOCUMENTS

| 2010/0211887 A1* | 8/2010 | Woollcombe ................. 715/751 |
| 2012/0054189 A1* | 3/2012 | Moonka et al. ................ 707/740 |
| 2013/0152010 A1* | 6/2013 | Weber et al. .................. 715/783 |

* cited by examiner

*Primary Examiner* — Aravind Moorthy
(74) *Attorney, Agent, or Firm* — Richard Brewster Main; Main Law Firm

(57) ABSTRACT

An online protection suite provides password management and a dashboard set of services combining single-click access to user accounts and a simple browser window automatically filled with offers for a variety of related products and services targeted especially for particular users. Each user is identified to a business partner server with a unique customer automatically sent from a simple browser embedded in the password management dashboard. The business partner server returns a webpage back to the simple browser that has been constructed especially for this user by leveraging sensitive and proprietary information collected by the business partner. Such customer information is not directly accessible to the password manager.

4 Claims, 4 Drawing Sheets

DYNAMIC MESSAGING IN A PERSONAL DATA PROTECTION SUITE

RELATED APPLICATIONS

This application is a continuation-in-part of U.S. patent application Ser. No. 13/277,216, filed Oct. 20, 2011, and titled, PERSONAL DATA PROTECTION SUITE; which was itself a continuation-in-part of U.S. patent application Ser. No. 12/754,086, filed Apr. 5, 2010, titled, USER AUTHENTICATION SYSTEM, that claims benefit of United States Patent Application Publication US 2008/0028444, published Jan. 31, 2008, titled SECURE WEBSITE AUTHENTICATION USING WEBSITE CHARACTERISTICS, SECURE USER CREDENTIALS AND PRIVATE BROWSER. This application also claims benefit of U.S. Provisional Patent Application No. 61/697,689, filed Sep. 6, 2012, and titled, DYNAMIC MESSAGING IN A PERSONAL DATA PROTECTION SUITE. All of which are incorporated herein, in full, by reference.

BACKGROUND OF THE INVENTION

1. Field of the Invention

The present invention relates to loyalty programs and benefits packages, and more particularly to leveraging frequently visited password management dashboards with simple browsers for presenting highly personalized, targeted, and customized ad content.

2. Description of Related Art

Getting one's customers to come back and buy more is good business. Very often sales of related products and services can be realized by just informing existing customers that such things are available. However the competition for consumers' eyes, ears, and attention is fierce and the average consumer tunes out or avoids the onslaught. Products and services from unfamiliar sources are especially unwelcome, and can be annoying if their messages nevertheless manage to reach their targets.

Computer users that have already chosen to purchase or subscribe to services like Internet, banking, cable, telephone, etc., tend to trust their suppliers as legitimate and reliable. So when these suppliers send messages to their subscribers, the subscribers will often read and consider the offers. It's why big companies look to be sponsors of sporting events, stadiums, etc.

On-line shopping and computer use in general has made most consumers remote and hard to reach for advertisers, at least in traditional ways. It was always the case that advertisers looked for the busy places where consumers were, e.g., hectic intersections, popular newspapers, hit TV shows, and other highly frequented locations. That's all been changing.

Password manager applications on computers are one place a typical user has to frequent, even daily. So displaying advertising on the same screen as a password manager's dashboard makes good sense to an advertiser.

No one computer security application can do it all and free competition has resulted in dozens, if not hundreds of offerings that promise many perspectives on similar problems. Advertising has been the traditional solution to finding customers for products and for customers to understand what's available. New technologies can be "pushed" to market and market demand can "pull" sales. In a marketing "pull" system the consumer requests the product and "pulls" it through the delivery channel.

Push marketing can be interactive, especially when the Internet is available as a communications channel. Amazon and other retailers learned long ago that sales can be enhanced if they suggest or push related products to those purchases already in a buyer's "shopping cart". Buyers are given the opportunity to click on the suggested products, often indicating how many other shoppers had bought these as well. The frequency of contact combined with relevance and trust of offer can increase the success of "push" marketing.

Protection suites are collections of best-in-class computer security products that make good sense when used in combination together. For example, NORTON™ SECURITY SUITE, IDENTITY GUARD®, SECURE BACKUP & SHARE, XFINITY™ TOOLBAR, etc.

SUMMARY OF THE INVENTION

Briefly, an online protection suite embodiment of the present invention provides password management and a dashboard set of services combining single-click access to user accounts and a simple browser window automatically filled with offers for a variety of related products and services targeted especially for a particular user or related segment of users. Each user is identified by a business partner server with a unique customer identifier, automatically sent from a simple browser embedded in the password management dashboard. The business partner server returns a webpage back to the simple browser that has been constructed especially for this user by leveraging sensitive and proprietary information collected by the business partner and associated with the passed unique identifier to the partner. Such customer information is not directly accessible to the password manager.

An advantage of embodiments of the present invention is that it allows partner businesses to engage with their own customers very dynamically even on a daily basis by marketing directly to a market of one.

A further advantage of embodiments of the present invention is that it allows partner businesses to use their own, proprietary customer relationship management (CRM) systems.

A still further advantage of embodiments of the present invention is that it is device agnostic, hence any device such as a PC or any mobile device with a display can be used to deliver targeted content immediately.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Embodiments of the present invention go far beyond the mere management of passwords for retail customers. The management of passwords for a user means that the typical user will be interacting with the password manager at least a few times a day. It has never been lost on advertisers that once you have someone's attention, an opportunity is presented to display some advertising. The opportunity is fleeting and only a few ads have a chance at being considered. Those chances improve with targeted advertising because the user's interest can be captured by saying the right things or displaying a graphic relevant to who the user is or want they want.

So, fundamentally a lure is needed that will engage a particular user on a frequent and regular basis. Password managers can do that. Email programs, browsers, and search engines are other devices that commonly engage users on a daily basis. But the password manager has an advantage over all these because there is a much higher level of security, identity, and motivation connected with the use of a password manager. Since users choose to use the password manager on their own, they are coming to a partner brand and are not being "pushed" any untargeted content. So, they are more receptive to advertisements from the partner businesses. In other kinds of situations, users can operate anonymously and will be hard to target advertising for them. Cookies and histories have been one way that conventional systems have gathered personalizing data to be used to select and forward target ads to the users' "eyeballs".

Figure 1:
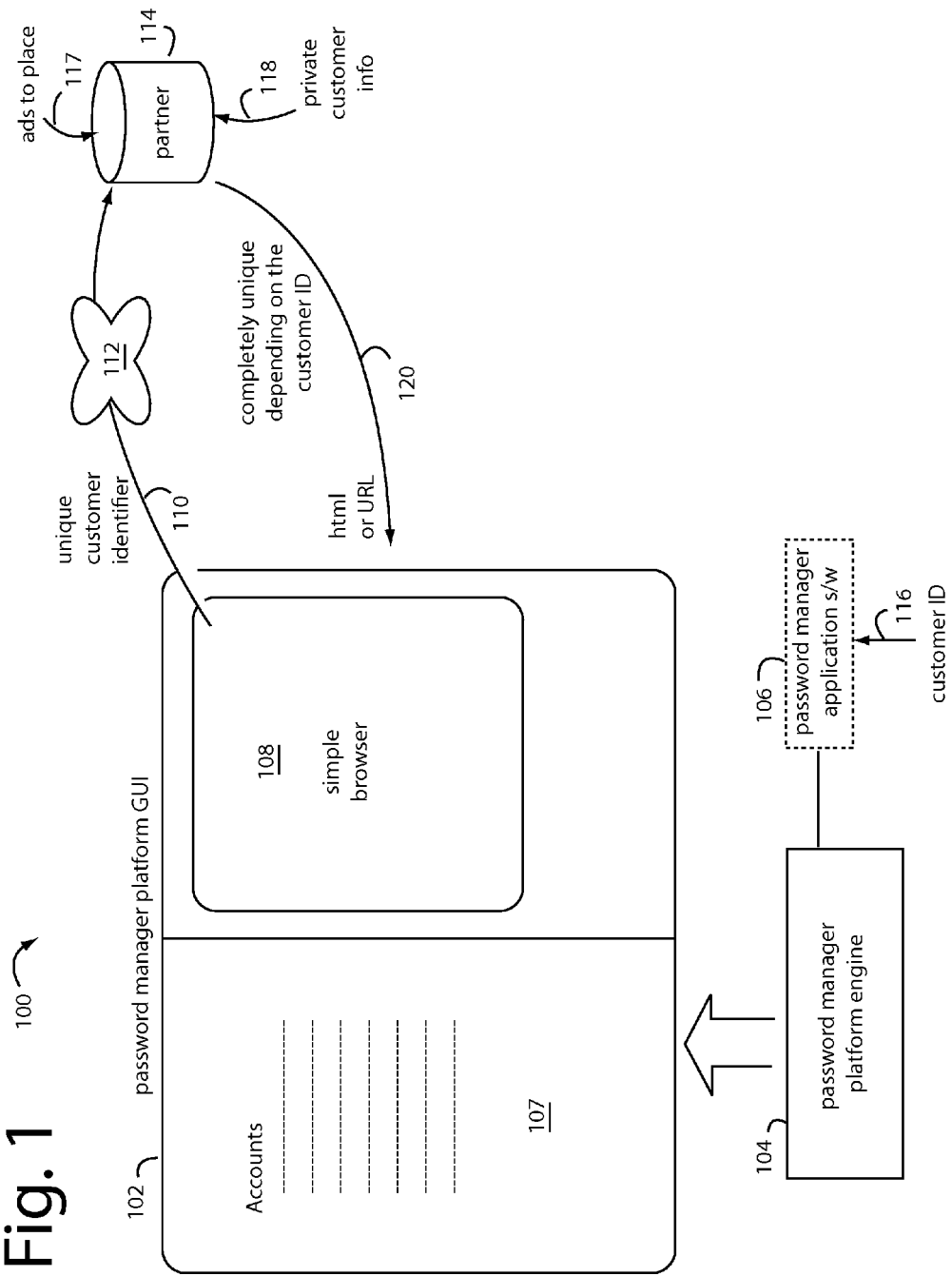
FIG. 1 is a schematic diagram of a password management platform that comprises a graphic user interface (GUI) driven by a platform engine.

FIG. 1 represents a password management platform 100, in an embodiment of the present invention that comprises a graphic user interface (GUI) 102 driven by a platform engine 104. GUI 102 provides a way for a user to interact with a password management application 106 and such can be implemented in a number of conventional ways, e.g., as a display attached to a WINDOWS based desktop computer with a mouse as a pointer, or as an ANDROID mobile device with a touchscreen. Platform engine 104 provides all the security, storage, computing, connectivity, and network support needed to drive GUI 102 and execute password management application 106. Platform engine 104 can be implemented with conventional devices, such as desktop computers, laptops, tablets, mobile smartphones, etc.

Password manager application 106 is implemented as proprietary software sold or otherwise provided to retail customers to install on their personal devices and to securely manage the storage and maintenance of various passwords, PIN's, and URL's they customarily use at various websites on the Internet. Such password manager application software 106 provides the look-and-feel of GUI 102 as experienced by the user.

A first partition 107 of GUI 102 provides a place to display user accounts, links, and online security and identity protection services. A second partition provides a simple browser 108 with the single limited purpose of displaying a business partner's website with targeted advertising.

Simple browser 108 automatically issues a call which includes a unique customer identifier 110. This moves through the Internet Cloud 112 to a business partner server 114. The unique customer identifier 110 is derived from customer identification (ID) data 116 originally provided by a business partner who operates server 114. Advertisements 117 are loaded into database 114 and can be selected to be delivered to target users according to their demographics or psychographic variables.

Customer ID data 116 can, and probably should be completely meaningless to password management application 106, e.g., for maximum business leverage. It is merely passed on as-needed by simple browser 108 when calling for a screen refresh. The customer ID data 116 is not useful to anyone else and does not contain in itself any sensitive user or subscriber information.

Partner server 114 has access to a database 118 of private and sensitive customer information that the business partner has accumulated for this or other purposes. For example, customer identification, account numbers, purchase histories, demographics, location, shopping habits, etc. In particular, the information collected is that which would be useful to help influence the kinds of advertising to deliver that would be most likely to succeed with this specific user. Partner server 114 uses unique customer identifier 110 to index database 118 and then builds and posts a webpage and its uniform resource locator (URL), or just sends the hypertext markup language (html), for a page to be displayed by simple browser 108.

Herein lies the great advantage of embodiments of the present invention, sensitive customer data 118 never leaves the secure environments of the business partners. It is however able to provide customized, even unique, offers and presentations on a password manager application GUI 102 provided by a vendor, without compromising proprietary interests or sensitive user information.

In a more down-to-earth exemplary embodiment of the present invention, White Sky (Mountain View, Calif.) markets White Sky Connect™ which lets consumers easily manage all their online accounts through a single application. With a single PIN, it provides consumers highly secure access to their financial, shopping, social networking, email and other online accounts. With a single click, consumers can access their financial and other online accounts while being protected against a variety of online threats. White Sky Connect provides: real-time online protection; one-click secure access to all online accounts for safer shopping, banking and socializing; secure credit card storage and form filling; protection against phishing and pharming scams; keystroke encryption that hides everything typed into online forms; and protection across personal computers, tablets, and smartphones.

GUI 102 is implemented as a so-called Personal Dashboard to give customers an easy way to monitor all their important services and to secure sensitive personal information. Instead of forcing customers to simultaneously manage multiple applications and services, high levels of protection can be provided by just one dashboard. The dashboard is always-on, and always-available to deliver one view of all password-protected accounts; an ability to manage all security services from a single place; access to password-protected accounts with one click; secure storage of all credit card accounts; and fast downloads and easy installation for all security options.

White Sky Connect™ includes real-time online protection service with one-click secure access to online user accounts, secure credit card storage, and protection against keyloggers. The security application is combined with a messaging service in which partners can integrate additional services and deliver targeted offers to their customers. Consumers typically use these applications an average of two times a day. That allows a brand to be put top-of-mind and makes services and offers visible every day. The Dynamic Messaging Service delivers personalized content that customers choose to engage with at their leisure, for dramatically increased conversion rates. Integrated multiple services and products as part of a daily-use application allows businesses to retain their customers, to promote brand awareness, and to build additional revenue streams.

A commercial product including an embodiment of the present invention was announced Jun. 7, 2012, as AOL OnePoint. Such is a secure desktop application that allows users to access all of their online accounts with one click, eliminating having to remember multiple passwords. It also creates a point to learn about and take advantage of AOL Advantage Plan member benefits. AOL OnePoint maintains a list of over 8,000 secure websites, and warns users when they are about to be redirected to a malicious website, protecting them from phishing scams and online identity theft.

White Sky's Connect™ Platform is allowing AOL to interact directly with customers through a dynamic personalized messaging service. The platform allows business partners like AOL to offer their subscribers multiple services through a single application platform. AOL, Comcast, and others with large customer bases can custom-build unique, compelling and integrated offers for their customers using these methods and systems. The platform is intended to increase customer loyalty and generate new incremental revenue for White Sky's business partners. Consumers benefit from the added security and privacy services for an enhanced online experience.

AOL Advantage Plans include online security and identity protection services, to help members take control and protect their identity, personal information and privacy. AOL OnePoint is a complement to the AOL Advantage Program with its robust online password protection. White Sky's customizable and highly secure platform allows AOL to efficiently deliver dynamic AOL Advantage Plan benefit messaging to their millions of users.

Figure 2:
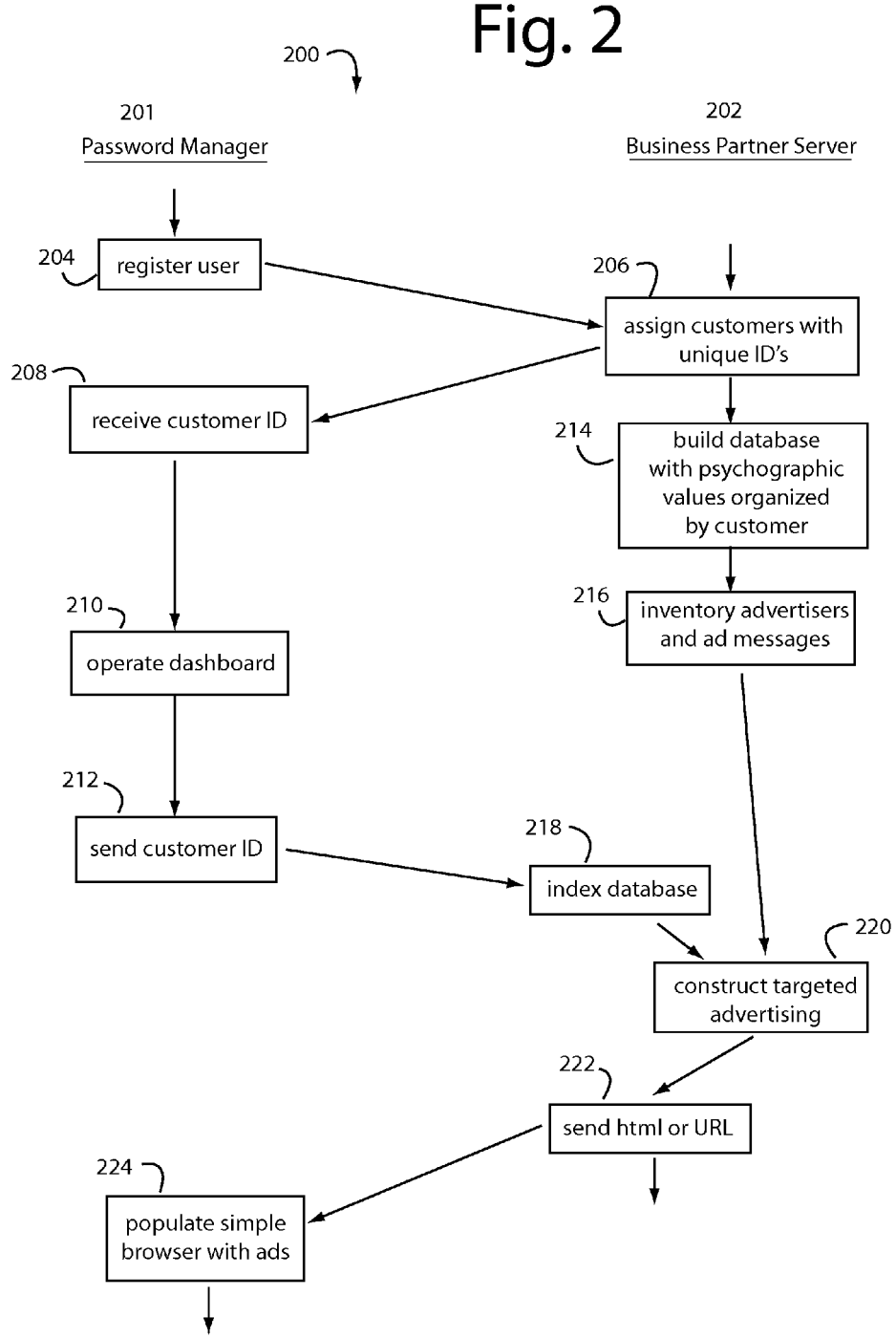
FIG. 2 is a flowchart diagram showing how a password manager dashboard operates over a network with a business partner server to provide particular users with targeted advertising that the business partner independently and privately decides is appropriate.

FIG. 2 represents a method embodiment of the present invention, and is referred to herein by the general reference numeral 200. Method 200 is implemented in software and can be executed on the devices illustrated in FIG. 1. A password manager 201 is licensed for its subscribers use by a business partner, which independently operates a server 202. There can be thousands of individual password managers 201 simultaneously supported by a single business partner server 202. For example, password managers 201 would be individually owned and operated by subscribers to an Internet Service Provider (ISP) like Comcast or AOL. The ISP would operate the business partner server 202, and would typically already have on file quite a bit of information about each of its subscribers. For example, name, address, web browsing histories, purchase preferences, payment accounts, etc.

A step 204 registers a new user and asks to be assigned a unique customer identifier. A step 206 assigns the unique customer identifier and such is received and stored by the password manager in a step 208. A step 210 causes the password manager dashboard to operate, e.g., to secure passwords and provide links to services. A step 212 automatically sends the unique customer identifier to the business partner server 202.

A step 214 collects and builds a database of customer demographics and psychographic values from a variety of conventional sources using well understood methods. A step 216 inventories, catalogs, and sorts advertiser messages and display ads according to target demographic and psychographic values. A step 218 receives the unique customer identifier from the password manager 201 and uses it as an index into the database to call up relevant demographic and psychographic values that can be used to target particular advertiser messages and display ads. A step 220 constructs a webpage accordingly. A step 222 forwards either the html or a URL for the webpage to the password manager 21. A step 224 uses the provided information to populate the simple browser window in the dashboard.

Figure 3:
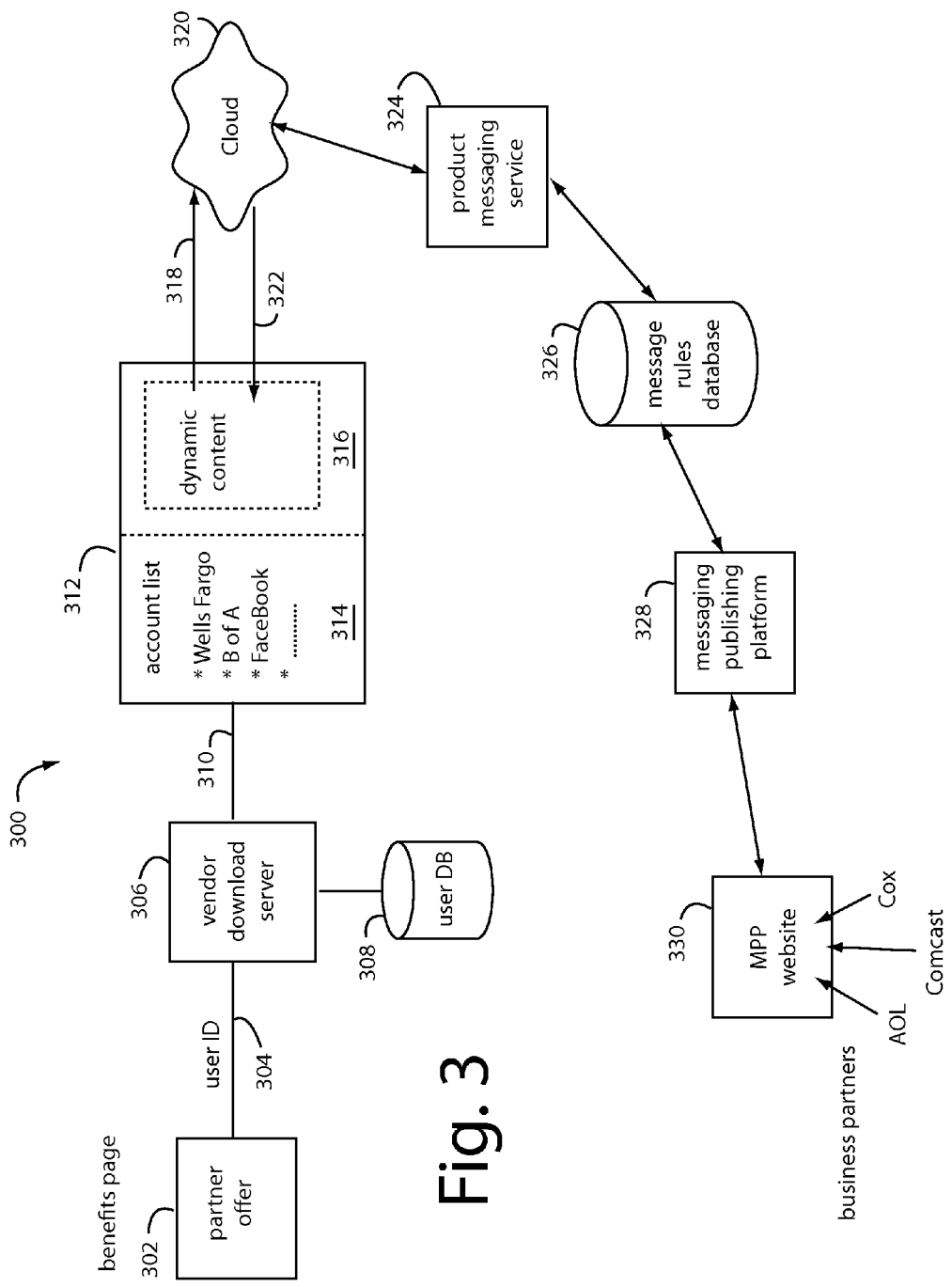
FIG. 3 is a schematic diagram of how a user obtains a download file from a business partner, installs it on their device, interacts with a password manager dashboard, and receives automatically delivered targeted advertising over the Cloud from a backend server with message rules and publishing platforms accessible to account managers.

FIG. 3 diagrams how a user obtains a download file from a business partner, installs it on their device, interacts with a password manager dashboard, and automatically receives targeted advertising over the Cloud from a backend server with message rules and publishing platforms accessible to account managers.

FIG. 3 represents an online security and ID protection system with targeted advertising, in an embodiment of the present invention referred to herein by the general reference numeral 300. System 300 provides the foundation for a password manager and ID protection vendor like White Sky (Mountain View, Calif.) to conduct a mutually beneficial business relationship with Internet service providers, banks, credit card companies, online retailers, and others with large subscriber or customer bases. Such allows the vendor's business partners to offer online security and ID protection benefits and other services without themselves having to design or maintain the offering. It further provides a mechanism to deliver targeted advertising according to a rule base or information the business partner maintains on its subscribers or customers.

System 300 includes a business partner's benefits webpage 302 which exclusively offers to its subscribers the vendor's online security and ID protection system, e.g., by application download. If the subscriber chooses to download the application, a vendor user ID 304 is forwarded to a vendor download server 306. The user ID 304 is inspected to see if it is legitimate, and to decide which business partner, version and branding of the application download will be appropriate. A user account is created by the vendor, such as White Sky, and a record is stored in a proprietary database 308. A business partner user ID 310 is generated and related to each vendor user ID 304 record in database 308, e.g., <vendor user ID, partner user ID>. This provides a mechanism for the vendor to deactivate users' accounts if they end their relationship with the business partner.

A personal dashboard 312 is initiated on the display of a user device and it includes a first part 314 for managing online security and ID protection. For example, user accounts with Wells Fargo, B of A, FaceBook, and other logon pages requiring passwords or PINs to sign in. A second part 316 provides for dynamic content display, e.g., targeted advertising. A request 318 includes identifying information such as vendor user ID 310 and forwards it into the Cloud 320 for service. A message, pointer, or uniform resource identifier (URI) 322 is returned to the dashboard 312 to direct the loading and display of dynamic content.

A fuller, more complete description of how the password management functions and operates is disclosed in the Parent application to this continuation-in-part, see U.S. patent application Ser. No. 13/277,216, filed Oct. 20, 2011, and titled, PERSONAL DATA PROTECTION SUITE. Such is incorporated herein by reference in full.

Returning now to FIG. 3, a product messaging service 324 provides the URI 322 according to the user ID found in request 318. The contents of URI 322 are constructed and assembled according to rules that have been stored in a message rules database 326. A messaging publishing platform (MPP) 328 supports a MPP website 330 present on the Internet. Various business partners, e.g., AOL, Comcast, Cox, etc., are given access so their advertising and/or account managers can manipulate and build a suite of rules that should be used by product messaging service 324.

In one embodiment of the present invention, the vendor who supplies the dashboard 312 also operates and manages the product messaging service 324, the message rules database 326, the MPP 328, and the MPP website 330. The advantage for the business partners is no backend integration is required by them, and they can move immediately to customizing the dynamic messages that their users see and can interact with on dashboard 312.

The user ID in request 318 is only meaningful to each of the respective business partners. Only they can access in their own records what demographics and particulars attach to a user by their corresponding user IDs. Personal, private, and proprietary information never has to leave the business partner's systems. At most, any compromise will be limited to what advertising has been selected for viewing by a particular user.

The system described in FIG. 3 highly amplifies the ability of a password manager vendor to offer a valuable tool that large operators can provide to their subscribers as a benefit and an important part of a loyalty program. The system described in FIG. 3 further provides an easy to adopt tool that can be implemented immediately by large operators without backend integration. The ongoing benefits are adaptable and dynamic to the specific needs and characteristics of individual users, without exposing sensitive client and user information to outsiders and third parties.

Figure 4:
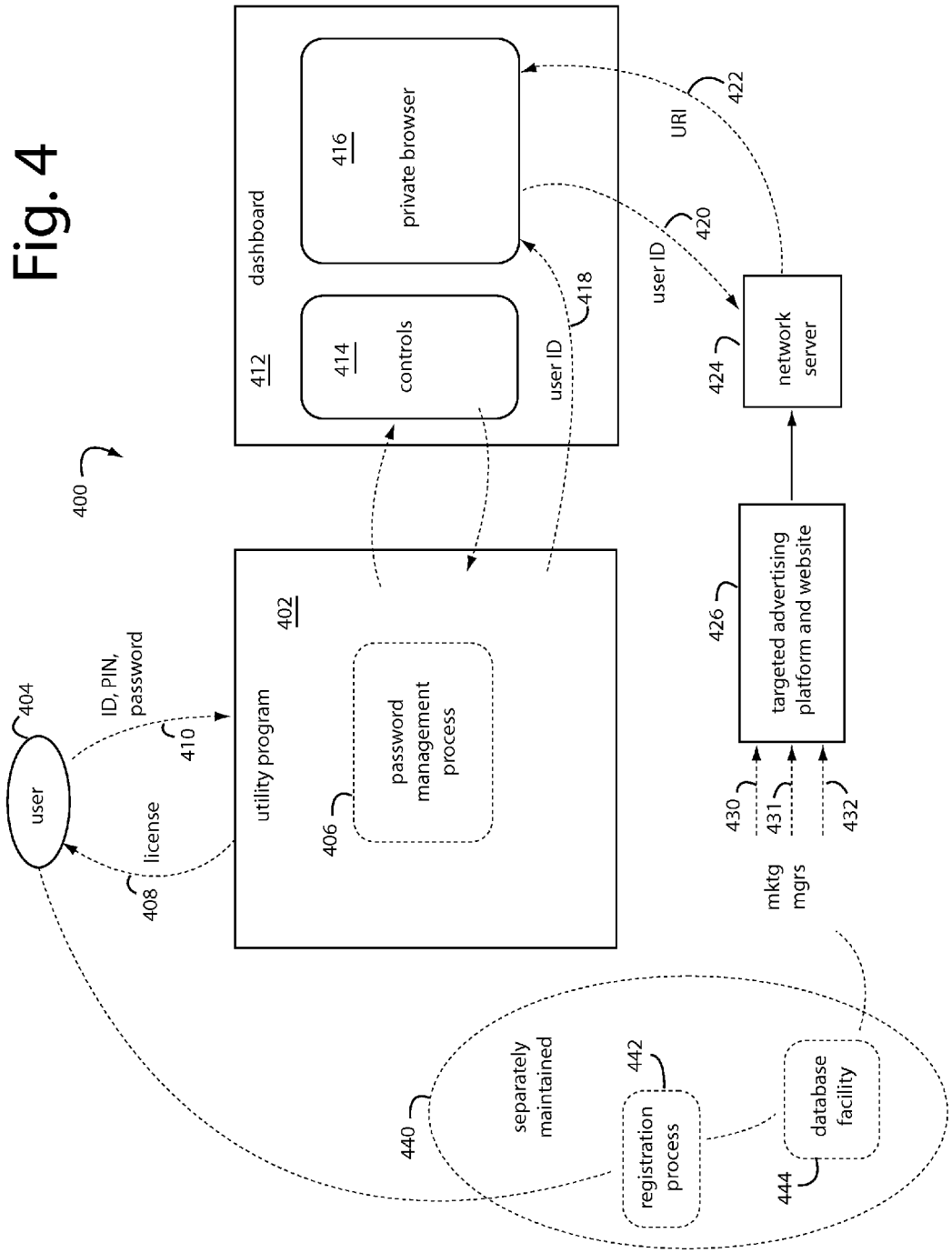
FIG. 4 is a schematic diagram of a subscriber loyalty appliance in an embodiment of the present invention.

FIG. 4 represents a subscriber loyalty appliance in an embodiment of the present invention, and is referred to herein by the general reference numeral 400. Subscriber loyalty appliance 400 includes a utility program 402 that draws a user 404 into frequent, and even daily interaction. For example, a password manager 406 like that marketed by White Sky, Inc. (Mountain View, Calif.) would qualify. User 404 purchases or is given a license 408 to use the utility program 402. User 404 identifies that they are a legitimate and authorized user by providing an ID, PIN, and/or password 410.

A dashboard 412 is provided as a graphical user interface (GUI) on a display screen of a personal device belonging to user 404. The dashboard 412 presents two fields, a controls field 414 and a private browser 416. A form of user ID 418 is provided by utility program 402 to private browser 416. This, in turn, is repeated as user ID 420 over the Internet to cause a URI 422 to be returned by a network server 424. What gets returned as URI 422 is highly dependent on who user 404 is and what kind of targeted advertising a targeted advertising and website 426 has calculated as promising to be the most effective.

Targeted advertising a targeted advertising and website 426 can be owned and maintained exclusively by the provider who has licensed the password manager 406. As such, it could be configured to operate and service independent groups of users "belonging" to corresponding and independent benefits program and loyalty program marketing managers, e.g., 430-432.

Private browser 416 operates independently of the controls field 414 and password manager 406. It exists in dashboard 412 to take advantage of the frequent visits by user 404. Private browser 416 operates best if it has an unbroken link with network server 424, but a constant link is not required. If a series of fresh new URI's 422 cannot be fetched, then previous ones can be displayed again, e.g., in rotation. If there is no previous URI 422 available, as would occur in a first use, then a generic set of URI's can be preloaded and called up during such times that are calculated to be of interest to all users of a class or category.

Each marketing manager 430-432 can privately maintain their own "Rolodex" of users, subscribers, and clients. Typically, each company they work for will have a preexisting customer relationship management (CRM) system 440 that includes a registration process 442 and database facility 444. A deliberately simple html and response interface provided by embodiments of the present invention enable quick and simple integration with any modern CRM system.

The marketing managers 430-432 are charged with managing their company's interactions with customers, clients, and sales prospects. The business logic employed by each CRM system 440 will determine what gets returned as URI 422. Such logic can be developed in parallel with the development of the client appliance 400.

Embodiments of the present invention provide another mechanism for them to independently organize, automate, and synchronize business, sales, marketing, customer service, and technical support activities. The general goals are to discover, draw, and attract new clients, develop and preserve those the company already has, to entice former clients to return, and to reduce costs.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A subscriber loyalty appliance, comprising:
a utility program installed on and enabled to execute on a user computer, and restricted by its instructions for use by a particular licensee and an identifiable user of a personal electronics device, and providing a service for drawing said identifiable user into frequent interaction;
a dashboard comprising a graphical user interface (GUI) with display screen means for presenting two visual fields with a first for a control field configured to control the utility program and a second for a private browser for said identifiable user;
a private browser visually disposed in the dashboard and including a computer process configured to automatically fetch its display contents from a network server according to a user identifier associated with said particular licensee of the utility program;
wherein, a frequent interaction by said identifiable user with the utility program is depended upon to increase user attention to said display contents of the private browser, and thereby promote subscriber loyalty by said identifiable user;
a personal dashboard implemented as an interactive graphical user interface (GUI) for presentation on a user display in a window having a visual split into a first part and a second part;
a password manager for providing one view of a plurality of password-protected accounts in said first part of the personal dashboard, for managing security services from a single place, for accessing password-protected accounts with one click, for arranging secure storage of credit card accounts, and for delivering downloads and installation of security options;
a unique customer identifier useful as an index into a private database of sensitive customer information;
a simple browser visually disposed in said second part of the personal dashboard and for automatic forwarding of the unique customer identifier over a network to a business partner server; and
means for the simple browser to only display webpages returned as hypertext markup language (html) or a uniform resource locator (URL) by the business partner server.

2. The subscriber loyalty appliance of claim 1, further comprising:

a password manager platform engine for executing a password manager application software, and for driving said dashboard GUI;

means for associating a single customer identifier (ID) with a single instance of said password manager; and means for further including content dependent on information held in a private database of customer information indexed according to said unique customer identifier if provided over said network to said business partner server.

3. The subscriber loyalty appliance of claim 2, further comprising:

means for calculating advertising for a particular user identified by said unique customer identifier, and for embedding such in said webpage returned as html or a URL, by the business partner server.

4. The subscriber loyalty appliance of claim 1, further comprising:

means for disposing a financial account list of hyperlinks in said first part of the personal dashboard and for providing access to preregistered financial websites with previously established user credentials for secure network sessions; and means for disposing a non-financial account list of hyperlinks in said first part of the personal dashboard and for providing access to preregistered non-financial websites with previously established user credentials for secure network sessions.

* * * * *